Sept. 15, 1925.
V. LAPHAM
VALVE
Filed March 19, 1923
1,553,943
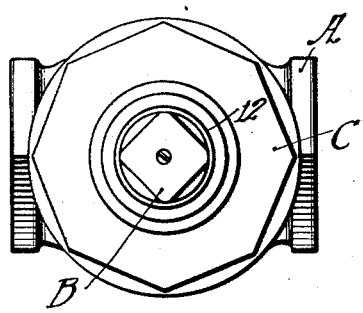
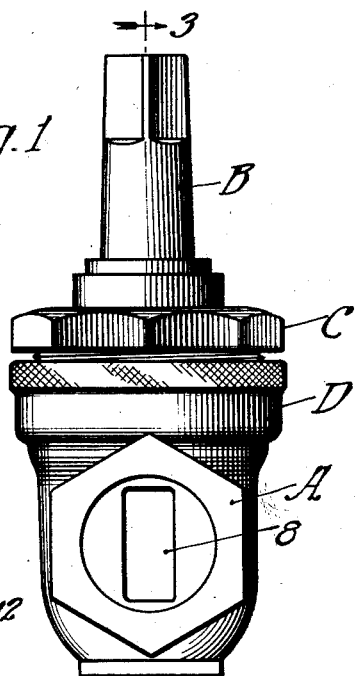
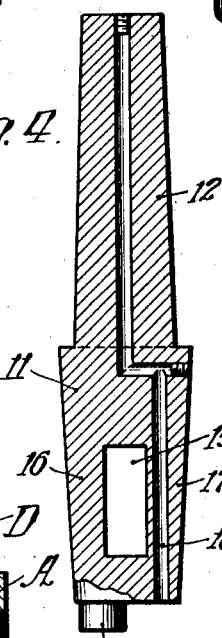
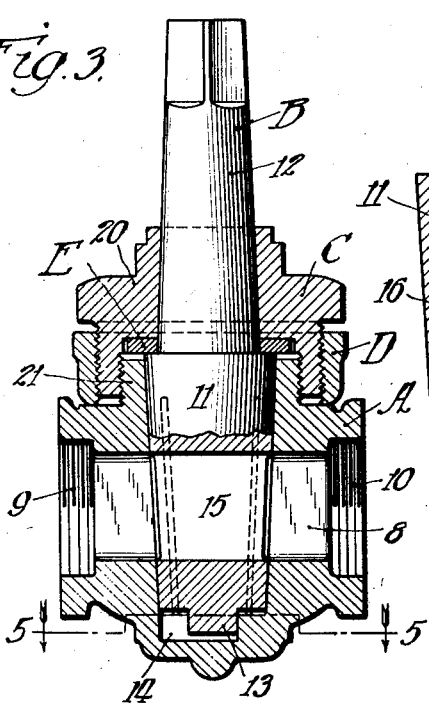
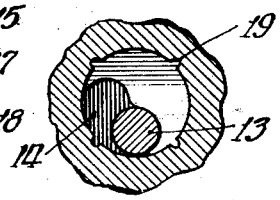
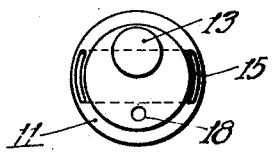
Inventor.
Valentine Lapham
By: George E. Mueller
Atty.

Patented Sept. 15, 1925.

1,553,943

UNITED STATES PATENT OFFICE.

VALENTINE LAPHAM, OF CHICAGO, ILLINOIS.

VALVE.

Application filed March 19, 1923. Serial No. 626,080.

*To all whom it may concern:*

Be it known that I, VALENTINE LAPHAM, citizen of the United States, residing at Chicago, in the county of Cook and State of Illinois, have invented a certain new and useful Improvement in Valves, of which the following is a full, clear, concise, and exact description, reference being had to the accompanying drawings, forming a part of this specification.

My invention relates to valves, and has to do more particularly with rotary valves having the tapering valve-plug adapted to be rotated to turn the valve on and off, an object being to provide a valve of this character which is simple of construction, positive in operation, and cheap to manufacture. A feature of my invention is the production of a valve of this character having a minimum number of pieces in a valve of certain requirements, which I consider essential to the best results. This will be more particularly pointed out in the ensuing part of the specification and appended claim.

For a better understanding of my invention, reference is to be had to the accompanying drawing in which Fig. 1 is an end elevation of the valve;

Fig. 2 is a top plan view of Fig. 1;

Fig. 3 is a vertical section through the valve;

Fig. 4 is a partial sectional view of the valve-plug;

Fig. 5 is a sectional view along the line 5—5 of Fig. 3; and

Fig. 6 is a bottom view of the valve-plug.

Referring now more in detail to the construction employed, I provide a valve body A, a valve-plug B, a plug cap C, a cap-lock D, and a ring E, although the latter is not essential. In the plug B I preferably provide a preferred and simplified form of stop at the bottom, to limit the rotary movement to a quarter turn, or ninety degrees.

In the valve body I provide one which has a longitudinal passage 8 therethrough, and a tapering perpendicular valve-plug seat through which the passage 8 extends. This passage is preferably rectangular, as indicated in Fig. 1, merging into the pipe receiving ends 9—10. The shape of this passage 8 provides a greater contacting surface in the valve seat. The plug B, which sets into the valve seat, has a tapering end 11 and a stem 12, preferably integral, and with an integral stud 13 extending down from the bottom of the plug into a recess 14 in the bottom wall of the body. The plug has a passage 15 therethrough, preferably corresponding in shape to the ports of the body passage 8. The stop stud 13 at the bottom of the plug is preferably set beneath one wall 16 of the plug, and through the opposite wall 17 I provide a lubricating passage 18 extending from the bottom of the plug to the top thereof, so that the valve may be lubricated if desired, although this is not essential. By placing the stud 13 and passage 18 on opposite sides of the plug, I prevent interference. In the tapering seat of the body I provide a plurality of lubricating recesses 19, when required.

In order to hold the plug in proper cooperative relation with the body, I provide a locking cap 20, fitting down over the stem 12, and threading onto a boss 21 of the body, and also a ring or washer E between the cap 20 and shoulder on the plug, although this ring is not essential. The cap 20 is screwed down until the plug is properly seated. In order to prevent the plug B from loosening from the seat or becoming too tight by accidental displacement of cap C, I provide a cap-lock D, preferably threaded on the outside of the cap C so as to abut a shoulder on the body, and thus lock the parts.

It will thus be seen that I have provided a plug of very simple construction and of minimum pieces, with means for positively maintaining the parts in proper cooperative relation, and with a simple movement limiting device which does not add to the number of pieces to the valve, and at the same time positive in operation and not adapted to get out of order.

What I claim as new and desire to secure by United States Letters Patent is:

A valve comprising a body member having a longitudinal passage therethrough and a perpendicular tapered valve seat in the body and an external threaded neck around the top of the seat, said seat terminating in a bottom wall of the body, a taper valve-plug rotatable in the valve seat, having an operating stem and an integral stud extending downwardly from the bottom of the plug into a recess in the bottom wall of the body to permit a quarter turn of the plug to open and close the valve, an internally shouldered plug cap fitting over the stem against a shoulder on the plug and having an internally and externally threaded skit threaded over the neck on the valve body to rotatably hold the plug in the seat, and a ring cap-lock threaded over the outside thread of the skirt of the cap for engagement with the valve body, to lock the cap in its holding position.

In witness whereof, I hereunto subscribe my name this 8th day of March A. D., 1923.

VALENTINE LAPHAM.